(12) United States Patent
Coroy

(10) Patent No.: US 8,977,129 B2
(45) Date of Patent: Mar. 10, 2015

(54) MULTI-DEGREE RECONFIGURABLE OPTICAL ADD-DROP MULTIPLEXING

(75) Inventor: Trenton Gary Coroy, Steinbach (CA)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/805,761

(22) PCT Filed: Mar. 8, 2012

(86) PCT No.: PCT/US2012/028207
§ 371 (c)(1),
(2), (4) Date: Dec. 20, 2012

(87) PCT Pub. No.: WO2013/133829
PCT Pub. Date: Sep. 12, 2013

(65) Prior Publication Data
US 2013/0236181 A1    Sep. 12, 2013

(51) Int. Cl.
*H04J 14/02*    (2006.01)

(52) U.S. Cl.
CPC ........... *H04J 14/021* (2013.01); *H04J 14/0204* (2013.01); *H04J 14/0205* (2013.01); *H04J 14/0213* (2013.01); *H04J 14/0217* (2013.01); *H04J 14/0212* (2013.01)
USPC .................... 398/83; 398/82; 398/45; 398/50

(58) Field of Classification Search
CPC . H04J 14/02–14/0227; H04Q 11/00–11/0071; H04Q 2011/00–2011/0035
USPC ............................... 398/7, 45, 82–88; 385/17
See application file for complete search history.

(56) References Cited

U.S. PATENT DOCUMENTS

| | | | |
|---|---|---|---|
| 6,853,763 B1* | 2/2005 | McNicol et al. | 385/17 |
| 2008/0138068 A1* | 6/2008 | Akiyama et al. | 398/50 |
| 2008/0181605 A1 | 7/2008 | Palacharla et al. | |
| 2009/0041457 A1* | 2/2009 | Maki et al. | 398/45 |
| 2009/0060416 A1* | 3/2009 | Yamamoto et al. | 385/24 |
| 2009/0067845 A1* | 3/2009 | Zhong et al. | 398/83 |
| 2009/0169200 A1* | 7/2009 | Li et al. | 398/7 |
| 2009/0232492 A1 | 9/2009 | Blair et al. | |
| 2009/0232497 A1* | 9/2009 | Archambault et al. | 398/50 |
| 2011/0164876 A1 | 7/2011 | Fujita et al. | |

(Continued)

FOREIGN PATENT DOCUMENTS

WO    2011/044371    4/2011

OTHER PUBLICATIONS

Ji et al: "Colorless and directionless multi-degree reconfigurable optical add/drop multiplexers", 19th Annual Wireless and Optical Communications Conference (WOCC), May 14-15, 2010, pp. 1-5.*

(Continued)

*Primary Examiner* — Li Liu
(74) *Attorney, Agent, or Firm* — Brundidge & Stanger, P.C.

(57) ABSTRACT

Various architectures of a multi-degree reconfigurable optical add-drop multiplexer with reduced contention are provided. These architectures allow the degree of contention reduction to be managed in a flexible and modular way. The degree of the node and the amount of add/drop at the node can also be managed in a flexible and modular way. This Abstract is submitted with the understanding that it will not be used to interpret or limit the scope or meaning of the claims.

25 Claims, 6 Drawing Sheets

(56) References Cited

U.S. PATENT DOCUMENTS

2011/0286746 A1 11/2011 Ji et al.
2013/0108215 A1* 5/2013 Ticknor et al. .................. 385/17

OTHER PUBLICATIONS

International Search Report and Written Opinion from International Application No. PCT/US2012/028207 mailed Apr. 27, 2012.
"Future Proof Your Network," Future Proof Your Network, accessed at http://web.archive.org/web/20130601055003/http://finisar.com/sites/defaultlfiles/pdf/J25RGNFlexgrid%20Tech%20Brief%2009_2010.pdf, accessed on Aug. 18, 2014, p. 1.
Colbourne, P., and Collings, B., "ROADM Switching Technologies", the National Fiber Optic Engineers Conference Optical Fiber Communication Conference and Exposition (OFC/NFOEC), pp. 1-3 (2011).
Pavon-Marino, P., and Bueno-Delgado, M.V., "Dimensioning the add/drop contention factor of directionless ROADMs," Lightwave Technology, vol. 29, No. 21, pp. 3265-3274 (2011).
Pavon-Marino, P., and Bueno-Delgado, M. V., "Add/drop contention and lightpath restoration performance in directionless ROADMs," MEC project TEC2010-21405-C02-02/CALM, pp. 1-11 (2011).
Zhang, X. J., et al., "Bridge-and-Roll Demonstration in GRIPhoN (Globally Reconfigurable Intelligent Photonic Network)," in National Fiber Optic Engineers Conference Optical Fiber Communication (OFC), OSA Technical Digest (CD), pp. 1-3 (2010).

* cited by examiner

MULTI-DEGREE RECONFIGURABLE OPTICAL ADD-DROP MULTIPLEXING

CROSS-REFERENCE TO RELATED APPLICATION

This Application is the National Stage filing under 35 U.S.C. §371 of PCT Application Ser. No. PCT/US12/28207 filed on Mar. 8, 2012. The disclosure of the PCT Application is hereby incorporated herein by reference in its entirety.

BACKGROUND

In fiber-optic communications, an optical add-drop multiplexer (OADM) is an optical node used in wavelength-division multiplexing (WDM) systems for multiplexing and routing different channels of light into or out of a single mode fiber. Typically, an OADM has the capability to add one or more new wavelength channels to an existing multi-wavelength WDM system; and to drop, or remove, one or more wavelength channels from the multi-wavelength WDM system by passing the dropped signals to another network path. A reconfigurable optical add-drop multiplexer (ROADM) is a type of OADM that enables an operation to remotely switch traffic in a WDM system at the wavelength layer without manual intervention. In "multi-degree" ROADM design, the number of line output ports to which a channel may be routed (or alternately the number of line input ports from which a channel may be routed) is considered the number of degrees. Signal addition and removal is not considered a degree.

Contentionless routing refers to the ability to add/drop multiple instances of the same channel wavelengths at the same ROADM node. Contentionless ROADMs are of interest as a means of ensuring fully flexible reconfigurable add/drop at an optical node, providing important operational benefits to a carrier. The number of these instances that can be supported at the same wavelength on either add ports or drop ports is referred to as the "contentionless degree" of the ROADM. When the contentionless degree of a ROADM is equal to or greater than the degree of the ROADM it is considered to be fully contentionless. However, implementation of such a fully contentionless ROADM may be cost prohibitive, especially for multi-degree nodes of high degree, due to factors including, for example, the amount and complexity of additional switching required, increased port count requirements for existing switch elements (e.g., wavelength selective switches), and for some architectures a need to provision a larger number of available transponders in preparation to quickly turn up add/drop traffic.

However, in the midst of relentless growth in bandwidth demand, specific traffic patterns for optical networks have proven to be difficult for carriers to predict. A node that begins as a few-degree node may unexpectedly need to quickly grow to become a many-degree node, and the amount of add/drop required at a particular node may also change unpredictably over time.

SUMMARY

Described herein are systems, apparatuses, methods, and techniques related to multi-degree reconfigurable optical add-drop multiplexing. In at least one aspect, an apparatus may comprise a distributing device, a combining device, a signal coupling device, and a reconfiguration device. The distributing device may include at least one first coupling element configured to distribute a plurality of input signals into groups of one or more signals. The combining device may include at least one second coupling element configured to combine signals into a group of signals. Each first coupling element is coupled to at least one second coupling element. The signal coupling device may be coupled to the distributing device and to the combining device, and may include a plurality of third coupling elements and a plurality of fourth coupling elements. The plurality of third coupling elements may be configured to accept groups of one or more signals from the distributing device. Each of the plurality of third coupling elements may be configured to combine signals into one or more drop groups of one or more signals. The plurality of fourth coupling elements may be configured to provide groups of one or more signals to the combining device. Each of the plurality of fourth coupling elements may be configured to accept one or more add groups of one or more signals, and to distribute accepted signals into one or more groups of one or more signals. The reconfiguration device may be coupled to the signal coupling device, and may include one or more signal removal units and one or more signal addition units. Each signal removal unit may be configured to accept one or more drop groups of signals from two or more of the third coupling elements, and to selectively receive signals from those groups. Each signal addition unit may be configured to transmit one or more signals, to selectively distribute the signals into one or more add groups, and to provide the one or more add groups to two or more of the fourth coupling elements.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
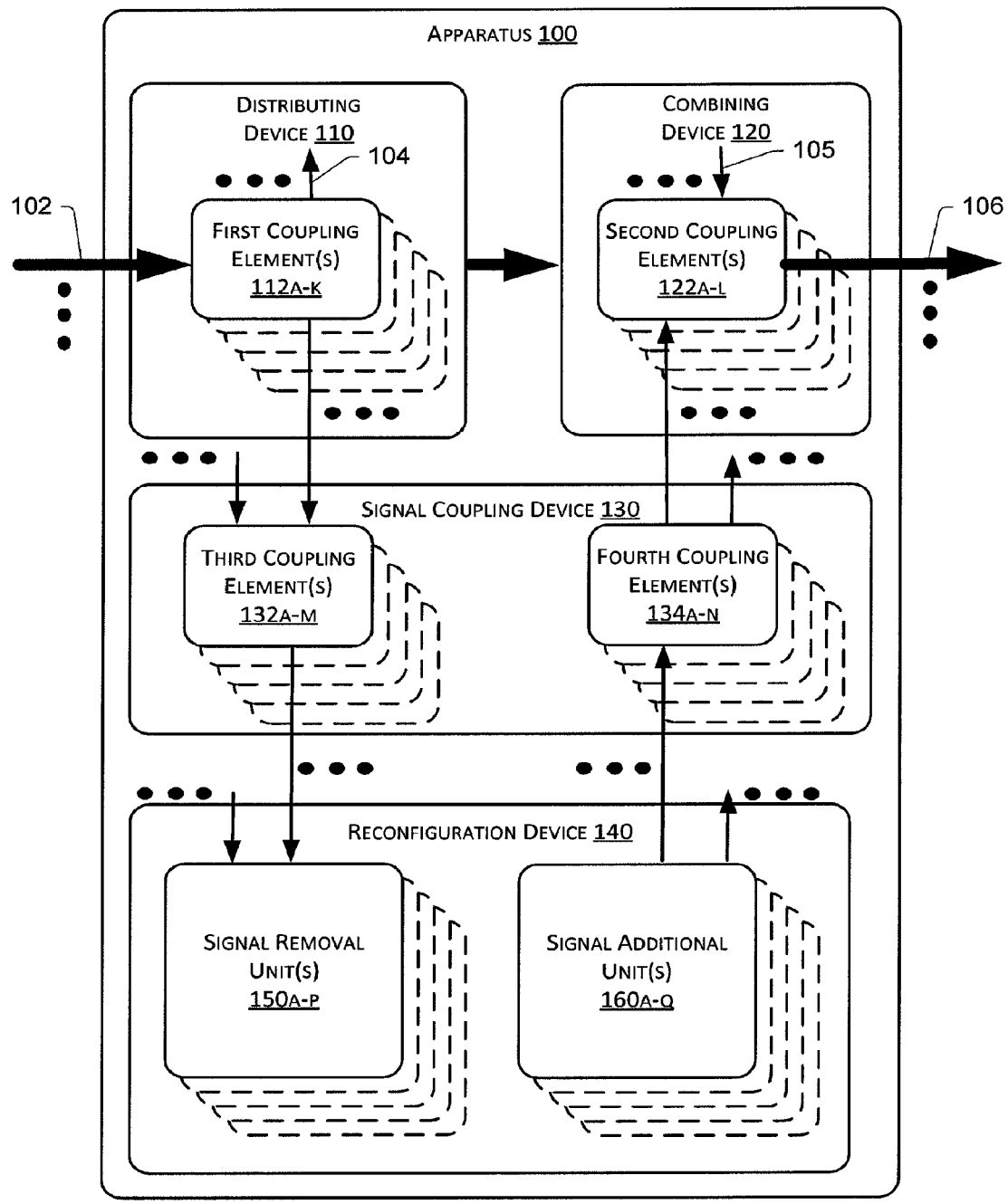
FIG. 1 shows an example apparatus for implementing at least one embodiment of multi-degree reconfigurable optical add-drop multiplexing.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are techniques related to multi-degree reconfigurable optical add-drop multiplexing. Each apparatus described below embodies a respective architecture for implementing multi-degree reconfigurable optical add-drop multiplexing.

Exemplary Architecture and Apparatus

FIG. 1 shows an example apparatus 100 for implementing at least one embodiment of multi-degree reconfigurable optical add-drop multiplexing.

As depicted, apparatus 100 includes distributing device 110, combining device 120, signal coupling device 130, and reconfiguration device 140. Apparatus 100 may accept a plurality of signals from a plurality of input optical fibers, and provide a plurality of signals to a plurality of output optical fibers. In order not to obscure the illustration, one input optical fiber 102 and one output optical fiber 106 are depicted in FIG. 1.

A distributing device 110 may accept the plurality of signals from the input optical fibers, distribute at least some of the accepted signals into groups of signals, and provide the groups of signals to the combining device 120 and the signal coupling device 130. Distributing device 110 may include one or more first coupling elements 112a-k. Each of first coupling elements 112a-k may include at least one input port to accept a plurality of input signals from at least one input optical fiber. Each of first coupling elements 112a-k may also include a plurality of output ports to provide at least some of the accepted signals as groups of signals, which may also be called signal groups hereinafter. For example, first coupling element 112a accepts a plurality of input signals from input optical fiber 102 and distributes at least some of the accepted signals into a plurality of signal groups. A group of signals may include zero, one, or more than one signal depending on the details of the implementation and how the apparatus 100 is configured. In some cases an input signal may be distributed to multiple output signal groups.

Each first coupling device 112a-k is coupled to at least one second coupling device 122a-l. For example, first coupling element 112a provides a signal group to second coupling element 122a, and may provide additional signal groups to additional second coupling elements 122b-l through one or more connections 104.

A combining device 120 may accept a plurality of groups of signals from the distributing device 110 and the signal coupling device 130, and combine at least some of the accepted signals into output groups of signals, each output signal group being provided to an output optical fiber. Combining device 120 may include one or more second coupling elements 122a-l. Each of second coupling elements 122a-l may include a plurality of input ports to accept groups of signals. Each of second coupling elements 122a-l may also include at least one output port to provide an output signal group to at least one output optical fiber. For example, second coupling element 122a accepts a plurality of signal groups, which includes a signal group from first coupling element 112a and which may include signal groups from additional first coupling elements 112b-k provided through one or more connections 105. Second coupling element 122a combines at least some of the accepted signals into an output signal group which is provided to output optical fiber 106.

Depending on the implementation, first and second coupling elements 112a-k and 122a-l may be passive or switchable in nature. However, at least one of these two types of coupling elements is switchable, as will be described in further detail below.

A signal coupling device 130 may accept groups of signals from the distributing device 110, provide drop groups of signals to the reconfiguration device 140, accept add groups of signals from the reconfiguration device 140, and provide groups of signals to the combining device 120. Signal coupling device 130 may include a plurality of third coupling elements 132a-m and a plurality of fourth coupling elements 134a-n. Each of third coupling elements 132a-m may include a plurality of input ports to accept a respective plurality of signal groups provided by a plurality of first coupling elements 112a-k of distributing device 110. Each of third coupling elements 132a-m may also include at least one output port to provide at least one drop group of signals. For example, third coupling element 132a accepts a plurality of signal groups, including a signal group from first coupling element 112a, and combines at least some of the accepted signals into a drop signal group which is provided to signal removal unit 150a.

Each of fourth coupling elements 134a-n may include at least one input port to accept at least one add group of signals. Each of fourth coupling elements 134a-n may also include a plurality of output ports to provide a respective plurality of signal groups to a plurality of second coupling elements 122a-l of combining device 120. For example, fourth coupling element 134a accepts an add group of signals from signal addition unit 160a and may distribute the accepted signals into a plurality of signal groups, including a signal group provided to second coupling element 122a. In some cases an add signal may be distributed to multiple signal groups.

Each of first coupling elements 112a-k, as well as each of fourth coupling elements 134a-n, has at least one input port and a plurality of output ports. Each of second coupling elements 122a-l, as well as each of third coupling elements 132a-m, has a plurality of input ports and at least one output port.

One or more first coupling elements 112a-k may be passive, e.g., a splitter, provided they have only a single input port. Alternatively, first coupling elements 112a-k may be switchable, e.g., a wavelength selective switch or optical cross-connect switch. Similarly one or more fourth coupling elements 134a-n may be passive when there is only a single input port. Alternatively fourth coupling elements 134a-n may be switchable.

Likewise, one or more second coupling elements 122a-1 may be passive, e.g., a passive combiner, provided they have only a single output port. Alternatively, second coupling elements 122a-l may be switchable. In a similar way one or more third coupling elements 132a-m may be passive, provided they have only a single output port. Alternatively, third coupling elements 132a-m may be switchable. Various ones of first coupling elements 112a-k, second coupling elements 122a-l, third coupling elements 132a-m, and fourth coupling elements 134*a-n* that are of the same type need not be identical, e.g., in terms of port or switching characteristics.

In various embodiments, passive and switchable elements may be mixed within the same type of coupling elements in apparatus 100. However, the following requirements need to be satisfied: (1) either all first coupling elements 112*a-k* are switchable or all second coupling elements 122*a-l* are switchable; (2) if all first coupling elements 112*a-k* are switchable, then third coupling elements 132*a-m* may be passive or switchable; otherwise third coupling elements 132*a-m* are switchable; and (3) if all second coupling elements 122*a-l* are switchable, then fourth coupling elements 134*a-n* may be passive or switchable; otherwise fourth coupling elements 134*a-n* are switchable.

A reconfiguration device 140 may accept a plurality of drop groups of signals from the signal coupling device 130 and provide a plurality of add groups of signals to the signal coupling device 130. Reconfiguration device 140 may include a plurality of signal removal units 150*a-p* and a plurality of signal addition units 160*a-q*. Each of signal removal units 150*a-p* may be coupled to two or more of the third coupling elements 132*a-m* to accept one or more drop signal groups, and may selectively receive one or more optical signals included in the plurality of drop signal groups. Each of signal addition units 160*a-q* may transmit one or more optical signals, and may selectively distribute these transmitted signals into one or more add signal groups provided to two or more of the fourth coupling elements 134*a-n*. In some cases a transmitted signal may be distributed to multiple add signal groups.

One or more of signal removal units 150*a-p* may be capable of receiving multiple signals assigned to occupy the same portion of wavelength spectrum, such signals being provided to a signal removal unit 150*a-p* by means of separate drop signal groups. One or more of signal removal units 150*a-p* may be capable of receiving multiple signals assigned to occupy different portions of wavelength spectrum.

One or more of signal addition units 160*a-q* may be capable of transmitting multiple signals assigned to occupy the same portion of wavelength spectrum, such signals being provided by a signal addition unit 160*a-q* by means of separate add signal groups. One or more signal addition units 160*a-q* may be capable of transmitting multiple signals assigned to occupy different portions of wavelength spectrum.

Apparatus 100 may allow one or more first coupling elements 112*a-k* to be either added or removed in service without disrupting existing signal traffic. Additionally or alternatively, apparatus 100 may allow one or more third coupling elements 132*a-m* to be either added or removed in service without disrupting existing signal traffic. Additionally or alternatively, apparatus 100 may allow one or more signal removal units 150*a-p* to be either added or removed in service without disrupting existing signal traffic. Additionally or alternatively, apparatus 100 may allow the number of connections between a signal removal unit 150*a-p* and the plurality of third coupling units 132*a-m* to be either increased or decreased in service without disrupting existing signal traffic.

Apparatus 100 may allow one or more second coupling elements 122*a-l* to be either added or removed in service without disrupting existing signal traffic. Additionally or alternatively, apparatus 100 may allow one or more fourth coupling elements 134*a-n* to be either added or removed in service without disrupting existing signal traffic. Additionally or alternatively, apparatus 100 may allow one or more signal addition units 160*a-q* to be either added or removed in service without disrupting existing signal traffic. Additionally or alternatively, apparatus 100 may allow the number of connections between a signal addition unit 160*a-q* and the plurality of fourth coupling units 134*a-n* to be either increased or decreased in service without disrupting existing signal traffic.

Apparatus 100 may be a multi-degree ROADM with reduced contention. A large proportion of the benefits of a fully contentionless ROADM may be obtainable in the architecture embodied in apparatus 100 with wavelength contention reduced but not fully eliminated. The architecture embodied in apparatus 100 allows the degree of contention reduction to be managed in a flexible and modular way. The degree of the node and the amount of add/drop at the node can also be managed in a flexible and modular way. The proposed architecture is able to support various next-generation ROADM requirements, including colorless, directionless, contentionless, and gridless (or flexible grid) routing. For example colorless functionality may be achieved with wavelength tunable transmitters and receivers (examples of the latter including receivers with tunable filters and tunable coherent receivers). Gridless functionality is supported by various switchable coupling element technologies.

Figure 2:
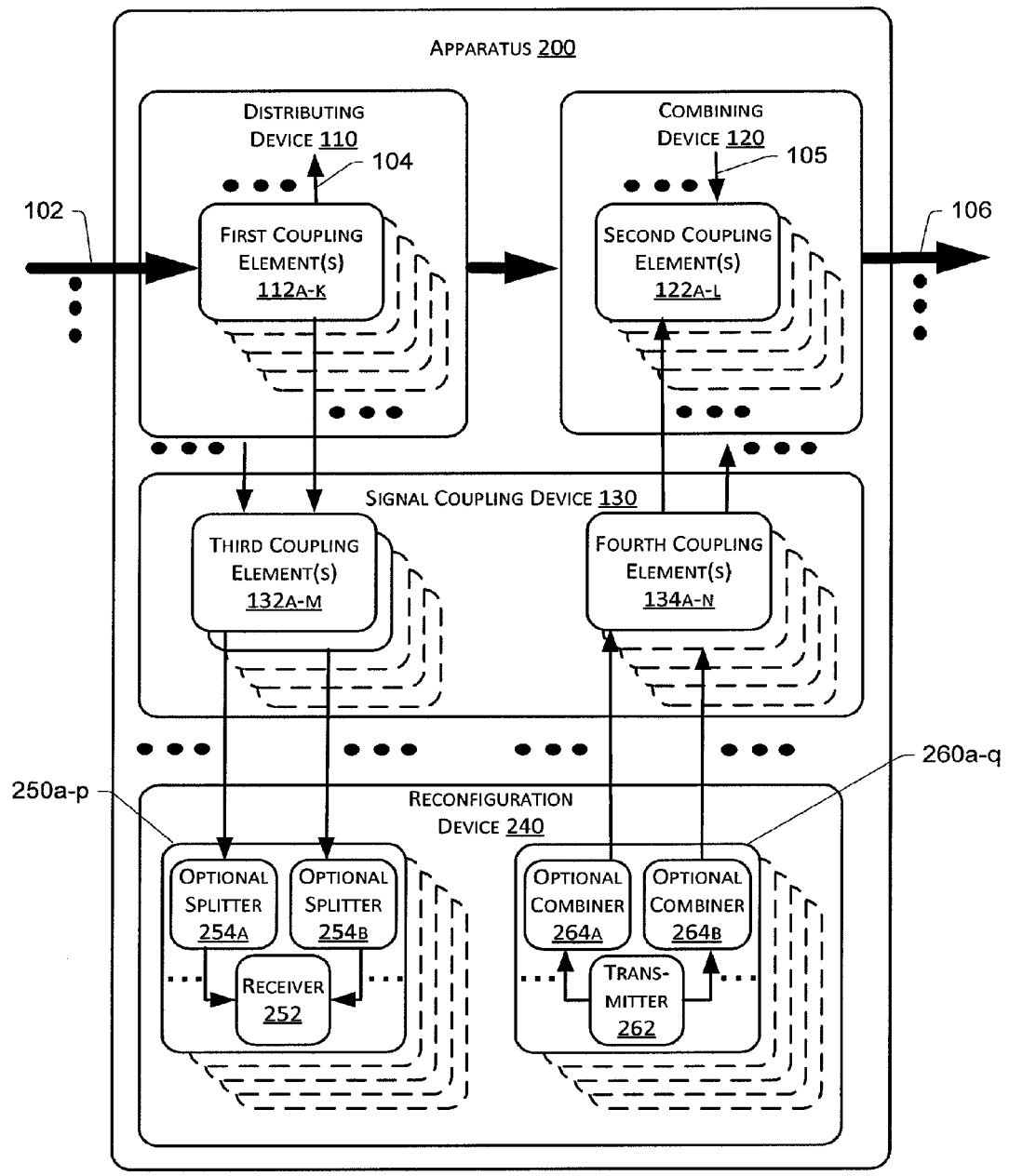
FIG. 2 shows another example apparatus for implementing at least one embodiment of multi-degree reconfigurable optical add-drop multiplexing.

FIG. 2 shows another example apparatus 200 for implementing at least one embodiment of multi-degree reconfigurable optical add-drop multiplexing. Apparatus 200 may be a multi-degree ROADM with reduced contention.

As depicted, apparatus 200 includes distributing device 110, combining device 120, signal coupling device 130, and reconfiguration device 240. Apparatus 200 may accept a plurality of signals from a plurality of input optical fibers, and provide a plurality of signals to a plurality of output optical fibers. In order not to obscure the illustration, one input optical fiber 102 and one output optical fiber 106 are depicted in FIG. 2. Distributing device 110, combining device 120, and signal coupling device 130 of apparatus 200 may be identical to those of apparatus 100. Accordingly, in the interest of brevity, detailed description of the structure and operations of distributing device 110, combining device 120, and signal coupling device 130 of apparatus 200 will not be repeated.

A reconfiguration device 240 may accept a plurality of drop groups of signals from the signal coupling device 130 and provide a plurality of add groups of signals to the signal coupling device 130. Reconfiguration device 240 may include a plurality of signal removal units 250*a-p* and a plurality of signal addition units 260*a-q*. Each of signal removal units 250*a-p* may be coupled to two or more of the third coupling elements 132*a-m* to accept one or more drop signal groups, and may selectively receive one or more optical signals included in the plurality of drop signal groups. Each of signal addition units 260*a-q* may transmit one or more optical signals, and may selectively distribute these transmitted signals into one or more add signal groups provided to two or more of the fourth coupling elements 134*a-n*. In some cases a transmitted signal may be distributed to multiple add signal groups.

As depicted in FIG. 2, at least one of signal removal units 250*a-p* may include a plurality of receivers, including a receiver 252. In order not to obscure the illustration, only receiver 252 is shown in FIG. 2, and it is understood the actual number of receivers in each of the signal removal units 250*a-p* may vary. In at least one embodiment, receiver 252 may be coupled to two or more of the third coupling elements 132*a-m* to accept a plurality of drop signal groups from the respective third coupling elements 132*a-m*. Optionally, receiver 252 may be coupled indirectly to two or more of the third coupling elements 132*a-m* via a plurality of splitters or demultiplexers. In other words, the plurality of receivers in the at least one of signal removal units 250*a-p* may be coupled to the plurality of splitters or demultiplexers. Each of the plurality of splitters or demultiplexers has an input port and a plurality of output ports. Each of the plurality of splitters or demultiplexers is configured to accept a drop group of signals at its input port and to provide a plurality of drop signal groups at a respective plurality of output ports. For example, as depicted in FIG. 2, splitter 254a and splitter 254b may be coupled between receiver 252 and two of the third coupling elements 132a-m.

One or more of the plurality of receivers, e.g., receiver 252, may be capable of receiving multiple wavelength multiplexed signals via the same receiver input port.

One or more of the plurality of receivers, e.g., receiver 252, may be capable of receiving multiple signals assigned to occupy the same portion of wavelength spectrum, such signals being provided to a signal removal unit 250a-p by means of separate drop signal groups and accepted by such a receiver at separate receiver input ports.

As depicted in FIG. 2, at least one of signal addition units 260a-q may include a plurality of transmitters, including a transmitter 262. In order not to obscure the illustration, only transmitter 262 is shown in FIG. 2, and it is understood the actual number of transmitters in each of the signal addition units 260a-q may vary. In at least one embodiment, transmitter 262 may be coupled to two or more fourth coupling elements 134a-n, and may distribute one or more transmitted signals into add groups provided to the two or more fourth coupling elements 134a-n via two or more transmitter output ports. Optionally, transmitter 262 may be coupled indirectly to two or more of the fourth coupling elements 134a-n via a plurality of combiners or multiplexers. In other words, the plurality of transmitters in the at least one of signal addition units 260a-q may be coupled to the plurality of combiners or multiplexers. Each of the plurality of combiners or multiplexers has a plurality of input ports and an output port. Each of the plurality of combiners or multiplexers is configured to accept a plurality of add signal groups at a respective plurality of input ports and to provide an add group of signals at its output port. For example, as depicted in FIG. 2, combiner 264a and combiner 264b may be coupled between transmitter 262 and two of the fourth coupling elements 134a-n.

One or more of the plurality of transmitters, e.g., transmitter 262, may be capable of transmitting multiple wavelength multiplexed signals via the same transmitter output port.

One or more of the plurality of transmitters, e.g., transmitter 262, may be capable of transmitting multiple signals assigned to occupy the same portion of wavelength spectrum, such signals being provided by such a transmitter at separate transmitter output ports and provided by a corresponding signal addition unit 260a-q by means of separate add signal groups.

Apparatus 200 may allow one or more first coupling elements 112a-k to be either added or removed in service without disrupting existing signal traffic. Additionally or alternatively, apparatus 200 may allow one or more third coupling elements 132a-m to be either added or removed in service without disrupting existing signal traffic. Additionally or alternatively, apparatus 200 may allow one or more signal removal units 250a-p to be either added or removed in service without disrupting existing signal traffic. Additionally or alternatively, apparatus 200 may allow the number of connections between a signal removal unit 250a-p and the plurality of third coupling units 132a-m to be either increased or decreased in service without disrupting existing signal traffic. Additionally or alternatively, apparatus 200 may allow receivers to be added to or removed from signal removal units 250a-p without disrupting existing signal traffic.

Apparatus 200 may allow one or more second coupling elements 122a-l to be either added or removed in service without disrupting existing signal traffic. Additionally or alternatively, apparatus 200 may allow one or more fourth coupling elements 134a-n to be either added or removed in service without disrupting existing signal traffic. Additionally or alternatively, apparatus 200 may allow one or more signal addition units 260a-q to be either added or removed in service without disrupting existing signal traffic. Additionally or alternatively, apparatus 200 may allow the number of connections between a signal addition unit 260a-q and the plurality of fourth coupling units 134a-n to be either increased or decreased in service without disrupting existing signal traffic. Additionally or alternatively, apparatus 200 may allow transmitters to be added to or removed from signal addition units 260a-q without disrupting existing signal traffic.

Apparatus 200 may be a multi-degree ROADM with reduced contention. A large proportion of the benefits of a fully contentionless ROADM may be obtainable in the architecture embodied in apparatus 200 with wavelength contention reduced but not fully eliminated. The architecture embodied in apparatus 200 allows the degree of contention reduction to be managed in a flexible and modular way. The degree of the node and the amount of add/drop at the node can also be managed in a flexible and modular way. The proposed architecture is able to support various next-generation ROADM requirements, including colorless, directionless, contentionless, and gridless (or flexible grid) routing. For example colorless functionality may be achieved with wavelength tunable transmitters and receivers (examples of the latter including receivers with tunable filters and tunable coherent receivers). Gridless functionality is supported by various switchable coupling element technologies.

Figure 3:
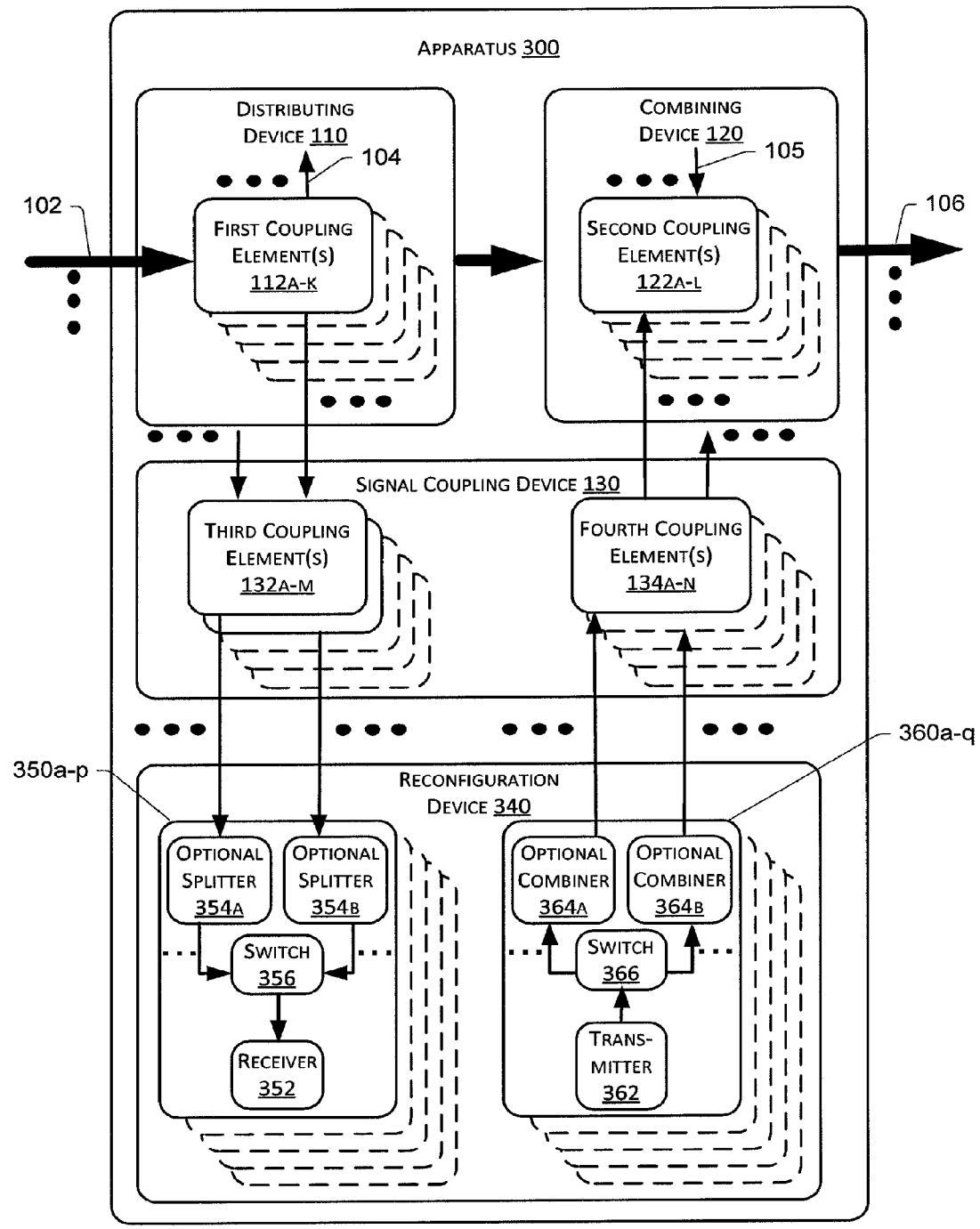
FIG. 3 shows yet another example apparatus for implementing at least one embodiment of multi-degree reconfigurable optical add-drop multiplexing.

FIG. 3 shows yet another example apparatus 300 for implementing at least one embodiment of multi-degree reconfigurable optical add-drop multiplexing.

As depicted, apparatus 300 includes distributing device 110, combining device 120, signal coupling device 130, and reconfiguration device 340. Apparatus 300 may accept a plurality of signals from a plurality of input optical fibers, and provide a plurality of signals to a plurality of output optical fibers. In order not to obscure the illustration, one input optical fiber 102 and one output optical fiber 106 are depicted in FIG. 3. Distributing device 110, combining device 120, and signal coupling device 130 of apparatus 300 may be identical to those of apparatus 100. Accordingly, in the interest of brevity, detailed description of the structure and operations of distributing device 110, combining device 120, and signal coupling device 130 of apparatus 300 will not be repeated.

A reconfiguration device 340 may accept a plurality of drop groups of signals from the signal coupling device 130 and provide a plurality of add groups of signals to the signal coupling device 130. Reconfiguration device 340 may include a plurality of signal removal units 350a-p and a plurality of signal addition units 360a-q. Each of signal removal units 350a-p may be coupled to two or more of the third coupling elements 132a-m to accept one or more drop signal groups, and may selectively receive one or more optical signals included in the plurality of drop signal groups. Each of signal addition units 360a-q may transmit one or more optical signals, and may selectively distribute these transmitted signals into one or more add signal groups provided to two or more of the fourth coupling elements 134a-n. In some cases a transmitted signal may be distributed to multiple add signal groups.

As depicted in FIG. 3, at least one of signal removal units 350a-p may include a plurality of receivers, including a receiver 352, and a plurality of switches, including a switch 356. In order not to obscure the illustration, only receiver 352 and switch 356 are shown in FIG. 3, and it is understood the actual number of receivers and the actual number of switches in each of the signal removal units 350a-p may vary. In at least one embodiment, receiver 352 may be coupled to switch 356, which in turn may be coupled to two or more of the third coupling elements 132a-m to accept a plurality of drop signal groups from the third coupling elements 132a-m. Optionally, switch 356 may be coupled indirectly to two or more of the third coupling elements 132a-m via a plurality of splitters or demultiplexers. In other words, the plurality of switches in the at least one of signal removal units 350a-p may be coupled between the plurality of receivers and the plurality of splitters or demultiplexers. In some embodiments, each of the plurality of switches may be respectively coupled to two or more of the plurality of splitters or demultiplexers, and each of the plurality of receivers may be coupled to a respective one of the switches. Each of the plurality of splitters or demultiplexers has an input port and a plurality of output ports. Each of the plurality of splitters or demultiplexers is configured to accept a drop group of signals at its input port and to provide a plurality of drop signal groups at a respective plurality of output ports. For example, as depicted in FIG. 3, splitter 354a and splitter 354b may be coupled between switch 356 and two of the third coupling elements 132a-m.

One or more of the plurality of receivers, e.g., receiver 352, may be capable of receiving multiple wavelength multiplexed signals via the same receiver input port.

One or more of signal removal units 350a-p may be capable of receiving multiple signals assigned to occupy the same portion of wavelength spectrum, such signals being provided to a signal removal unit 350a-p by means of separate drop signal groups. This may be facilitated by configuring switches such that each of these signals is routed to a different receiver.

As depicted in FIG. 3, at least one of signal addition units 360a-q may include a plurality of transmitters, including a transmitter 362, and a plurality of switches, including switch 366. In order not to obscure the illustration, only transmitter 362 and switch 366 are shown in FIG. 3, and it is understood the actual number of transmitters and the actual number of switches in each of the signal addition units 360a-q may vary. In at least one embodiment, transmitter 362 may be coupled to switch 366, which in turn may be coupled to two or more fourth coupling elements 134a-n such that one or more transmitted signals are distributed into add groups provided to the two or more fourth coupling elements 134a-n via two or more switch output ports. Optionally, switch 366 may be coupled indirectly to two or more of the fourth coupling elements 134a-n via a plurality of combiners or multiplexers. In other words, the plurality of switches in the at least one of signal addition units 360a-q may be coupled between the plurality of transmitters and the plurality of combiners or multiplexers. In some embodiments, each of the plurality of switches may be respectively coupled to two or more of the plurality of combiners or multiplexers, and each of the plurality of transmitters may be coupled to a respective one of the switches. Each of the plurality of combiners or multiplexers has a plurality of input ports and an output port. Each of the plurality of combiners or multiplexers is configured to accept a plurality of add signal groups at a respective plurality of input ports and to provide an add group of signals at its output port. For example, as depicted in FIG. 3, combiner 364a and combiner 364b may be coupled between switch 366 and two of the fourth coupling elements 134a-n.

One or more of the plurality of transmitters, e.g., transmitter 362, may be capable of transmitting multiple wavelength multiplexed signals via the same transmitter output port.

One or more of signal addition units 360a-q may be capable of transmitting multiple signals assigned to occupy the same portion of wavelength spectrum, such signals being provided by a signal addition unit 360a-q by means of separate add signal groups. This may be facilitated by configuring switches such that each of these signals is routed from a different transmitter. Alternately if multiple copies of the same signal are desired this may be facilitated by configuring a switch coupled to a transmitter to distribute the transmitted signal such that it is included in multiple add signal groups.

Apparatus 300 may allow one or more first coupling elements 112a-k to be either added or removed in service without disrupting existing signal traffic. Additionally or alternatively, apparatus 300 may allow one or more third coupling elements 132a-m to be either added or removed in service without disrupting existing signal traffic. Additionally or alternatively, apparatus 300 may allow one or more signal removal units 350a-p to be either added or removed in service without disrupting existing signal traffic. Additionally or alternatively, apparatus 300 may allow the number of connections between a signal removal unit 350a-p and the plurality of third coupling units 132a-m to be either increased or decreased in service without disrupting existing signal traffic. Additionally or alternatively, apparatus 300 may allow receivers to be added to or removed from signal removal units 350a-p without disrupting existing signal traffic.

Apparatus 300 may allow one or more second coupling elements 122a-l to be either added or removed in service without disrupting existing signal traffic. Additionally or alternatively, apparatus 300 may allow one or more fourth coupling elements 134a-n to be either added or removed in service without disrupting existing signal traffic. Additionally or alternatively, apparatus 300 may allow one or more signal addition units 360a-q to be either added or removed in service without disrupting existing signal traffic. Additionally or alternatively, apparatus 300 may allow the number of connections between a signal addition unit 360a-q and the plurality of fourth coupling units 134a-n to be either increased or decreased in service without disrupting existing signal traffic. Additionally or alternatively, apparatus 300 may allow transmitters to be added to or removed from signal addition units 360a-q without disrupting existing signal traffic.

Apparatus 300 may be a multi-degree ROADM with reduced contention. A large proportion of the benefits of a fully contentionless ROADM may be obtainable in the architecture embodied in apparatus 300 with wavelength contention reduced but not fully eliminated. The architecture embodied in apparatus 300 allows the degree of contention reduction to be managed in a flexible and modular way. The degree of the node and the amount of add/drop at the node can also be managed in a flexible and modular way. The proposed architecture is able to support various next-generation ROADM requirements, including colorless, directionless, contentionless, and gridless (or flexible grid) routing. For example colorless functionality may be achieved with wavelength tunable transmitters and receivers (examples of the latter including receivers with tunable filters and tunable coherent receivers). Gridless functionality is supported by various switchable coupling element technologies.

Figure 4:
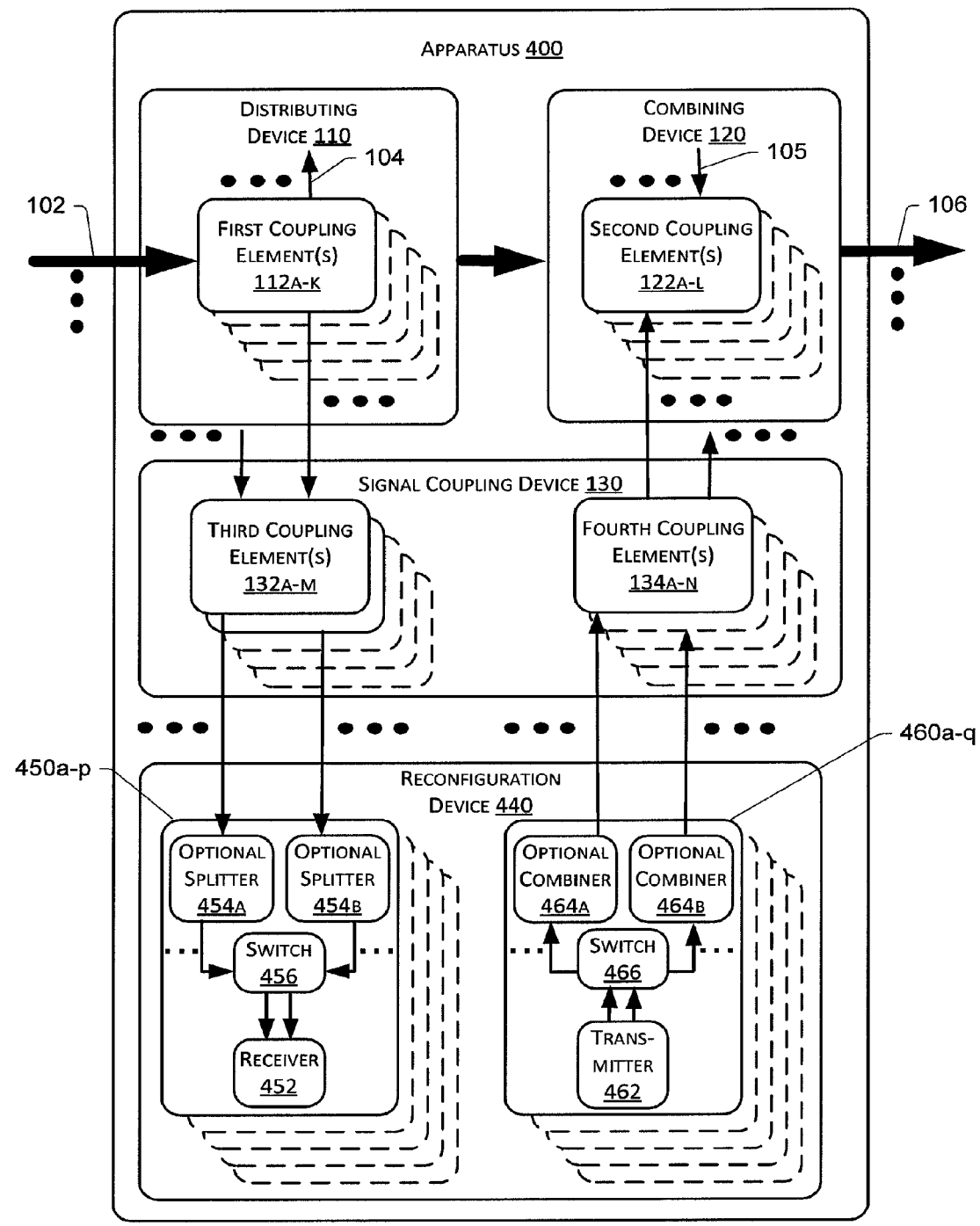
FIG. 4 shows still another example apparatus for implementing at least one embodiment of multi-degree reconfigurable optical add-drop multiplexing.

FIG. 4 shows still another example apparatus 400 for implementing at least one embodiment of multi-degree reconfigurable optical add-drop multiplexing.

As depicted, apparatus 400 includes distributing device 110, combining device 120, signal coupling device 130, and reconfiguration device 440. Apparatus 400 may accept a plurality of signals from a plurality of input optical fibers, and provide a plurality of signals to a plurality of output optical fibers. In order not to obscure the illustration, one input optical fiber 102 and one output optical fiber 106 are depicted in FIG. 4. Distributing device 110, combining device 120, and signal coupling device 130 of apparatus 400 may be identical to those of apparatus 100. Accordingly, in the interest of brevity, detailed description of the structure and operations of distributing device 110, combining device 120, and signal coupling device 130 of apparatus 400 will not be repeated.

A reconfiguration device 440 may accept a plurality of drop groups of signals from the signal coupling device 130 and provide a plurality of add groups of signals to the signal coupling device 130. Reconfiguration device 440 may include a plurality of signal removal units 450a-p and a plurality of signal addition units 460a-q. Each of signal removal units 450a-p may be coupled to two or more of the third coupling elements 132a-m to accept one or more drop signal groups, and may selectively receive one or more optical signals included in the plurality of drop signal groups. Each of signal addition units 460a-q may transmit one or more optical signals, and may selectively distribute these transmitted signals into one or more add signal groups provided to two or more of the fourth coupling elements 134a-n. In some cases a transmitted signal may be distributed to multiple add signal groups.

As depicted in FIG. 4, at least one of signal removal units 450a-p may include a plurality of receivers, including a receiver 452, and a plurality of switches, including a switch 456. In order not to obscure the illustration, only receiver 452 and switch 456 are shown in FIG. 4, and it is understood the actual number of receivers and the actual number of switches in each of the signal removal units 450a-p may vary. In at least one embodiment, receiver 452 may be coupled to switch 456, which in turn may be coupled to two or more of the third coupling elements 132a-m to accept a plurality of drop signal groups from the third coupling elements 132a-m. Optionally, switch 456 may be coupled indirectly to two or more of the third coupling elements 132a-m via a plurality of splitters or demultiplexers. In other words, the plurality of switches in the at least one of signal removal units 450a-p may be coupled between the plurality of receivers and the plurality of splitters or demultiplexers. In some embodiments, each of the plurality of switches may be respectively coupled to two or more of the plurality of splitters or demultiplexers, and each of the plurality of receivers may be coupled to a respective one of the switches. Each of the plurality of splitters or demultiplexers has an input port and a plurality of output ports. Each of the plurality of splitters or demultiplexers is configured to accept a drop group of signals at its input port and to provide a plurality of drop signal groups at a respective plurality of output ports. For example, as depicted in FIG. 4, splitter 454a and splitter 454b may be coupled between switch 456 and two of the third coupling elements 132a-m.

One or more of the plurality of receivers, e.g., receiver 452, may be capable of receiving multiple wavelength multiplexed signals via the same receiver input port One or more of the plurality of receivers, e.g., receiver 452, may be capable of receiving multiple signals assigned to occupy the same portion of wavelength spectrum, such signals being provided to a signal removal unit 450a-p by means of separate drop signal groups and accepted by such a receiver at separate receiver input ports.

In addition, one or more of signal removal units 450a-p may be capable of receiving multiple signals assigned to occupy the same portion of wavelength spectrum by use of switching, such signals being provided to a signal removal unit 450a-p by means of separate drop signal groups. This may be facilitated by configuring switches such that each of these signals is routed to a different receiver input port. Each of these input ports may correspond to a different receiver, or in the case of a receiver capable of receiving such multiple signals as described above then two or more of the input ports may correspond to the same receiver.

As depicted in FIG. 4, at least one of signal addition units 460a-q may include a plurality of transmitters, including a transmitter 462, and a plurality of switches, including switch 466. In order not to obscure the illustration, only transmitter 462 and switch 466 are shown in FIG. 4, and it is understood the actual number of transmitters and the actual number of switches in each of the signal addition units 460a-q may vary. In at least one embodiment, transmitter 462 may be coupled to switch 466, which in turn may be coupled to two or more fourth coupling elements 134a-n such that one or more transmitted signals are distributed into add groups provided to the two or more fourth coupling elements 134a-n via two or more switch output ports. Optionally, switch 466 may be coupled indirectly to two or more of the fourth coupling elements 134a-n via a plurality of combiners or multiplexers. In other words, the plurality of switches in the at least one of signal addition units 460a-q may be coupled between the plurality of transmitters and the plurality of combiners or multiplexers. In some embodiments, each of the plurality of switches may be respectively coupled to two or more of the plurality of combiners or multiplexers, and each of the plurality of transmitters may be coupled to a respective one of the switches. Each of the plurality of combiners or multiplexers has a plurality of input ports and an output port. Each of the plurality of combiners or multiplexers is configured to accept a plurality of add signal groups at a respective plurality of input ports and to provide an add group of signals at its output port. For example, as depicted in FIG. 4, combiner 464a and combiner 464b may be coupled between switch 466 and two of the fourth coupling elements 134a-n.

One or more of the plurality of transmitters, e.g., transmitter 462, may be capable of transmitting multiple wavelength multiplexed signals via the same transmitter output port.

One or more of the plurality of transmitters, e.g., transmitter 462, may be capable of transmitting multiple signals assigned to occupy the same portion of wavelength spectrum, such signals being provided by such a transmitter at separate transmitter output ports and provided by a corresponding signal addition unit 460a-q by means of separate add signal groups.

In addition, one or more of signal addition units 460a-q may be capable of transmitting multiple signals assigned to occupy the same portion of wavelength spectrum by use of switching, such signals being provided by a signal addition unit 460a-q by means of separate add signal groups. This may be facilitated by configuring switches such that each of these signals is routed from a different transmitter output port. Each of these output ports may correspond to a different transmitter, or in the case of a transmitter capable of transmitting such multiple signals as described above then two or more of the output ports may correspond to the same transmitter. Alternately if multiple copies of the same signal are desired this may be facilitated by configuring a switch coupled to a transmitter to distribute a transmitted signal such that it is included in multiple add signal groups.

Apparatus 400 may allow one or more first coupling elements 112a-k to be either added or removed in service without disrupting existing signal traffic. Additionally or alternatively, apparatus 400 may allow one or more third coupling elements 132a-m to be either added or removed in service without disrupting existing signal traffic. Additionally or alternatively, apparatus 400 may allow one or more signal removal units 450a-p to be either added or removed in service without disrupting existing signal traffic. Additionally or alternatively, apparatus 400 may allow the number of connections between a signal removal unit 450a-p and the plurality of third coupling units 132a-m to be either increased or decreased in service without disrupting existing signal traffic. Additionally or alternatively, apparatus 400 may allow receivers to be added to or removed from signal removal units 450a-p without disrupting existing signal traffic.

Apparatus 400 may allow one or more second coupling elements 122a-l to be either added or removed in service without disrupting existing signal traffic. Additionally or alternatively, apparatus 400 may allow one or more fourth coupling elements 134a-n to be either added or removed in service without disrupting existing signal traffic. Additionally or alternatively, apparatus 400 may allow one or more signal addition units 460a-q to be either added or removed in service without disrupting existing signal traffic. Additionally or alternatively, apparatus 400 may allow the number of connections between a signal addition unit 460a-q and the plurality of fourth coupling units 134a-n to be either increased or decreased in service without disrupting existing signal traffic. Additionally or alternatively, apparatus 400 may allow transmitters to be added to or removed from signal addition units 460a-q without disrupting existing signal traffic.

Apparatus 400 may be a multi-degree ROADM with reduced contention. A large proportion of the benefits of a fully contentionless ROADM may be obtainable in the architecture embodied in apparatus 400 with wavelength contention reduced but not fully eliminated. The architecture embodied in apparatus 400 allows the degree of contention reduction to be managed in a flexible and modular way. The degree of the node and the amount of add/drop at the node can also be managed in a flexible and modular way. The proposed architecture is able to support various next-generation ROADM requirements, including colorless, directionless, contentionless, and gridless (or flexible grid) routing. For example colorless functionality may be achieved with wavelength tunable transmitters and receivers (examples of the latter including receivers with tunable filters and tunable coherent receivers). Gridless functionality is supported by various switchable coupling element technologies.

Exemplary Process

Figure 5:
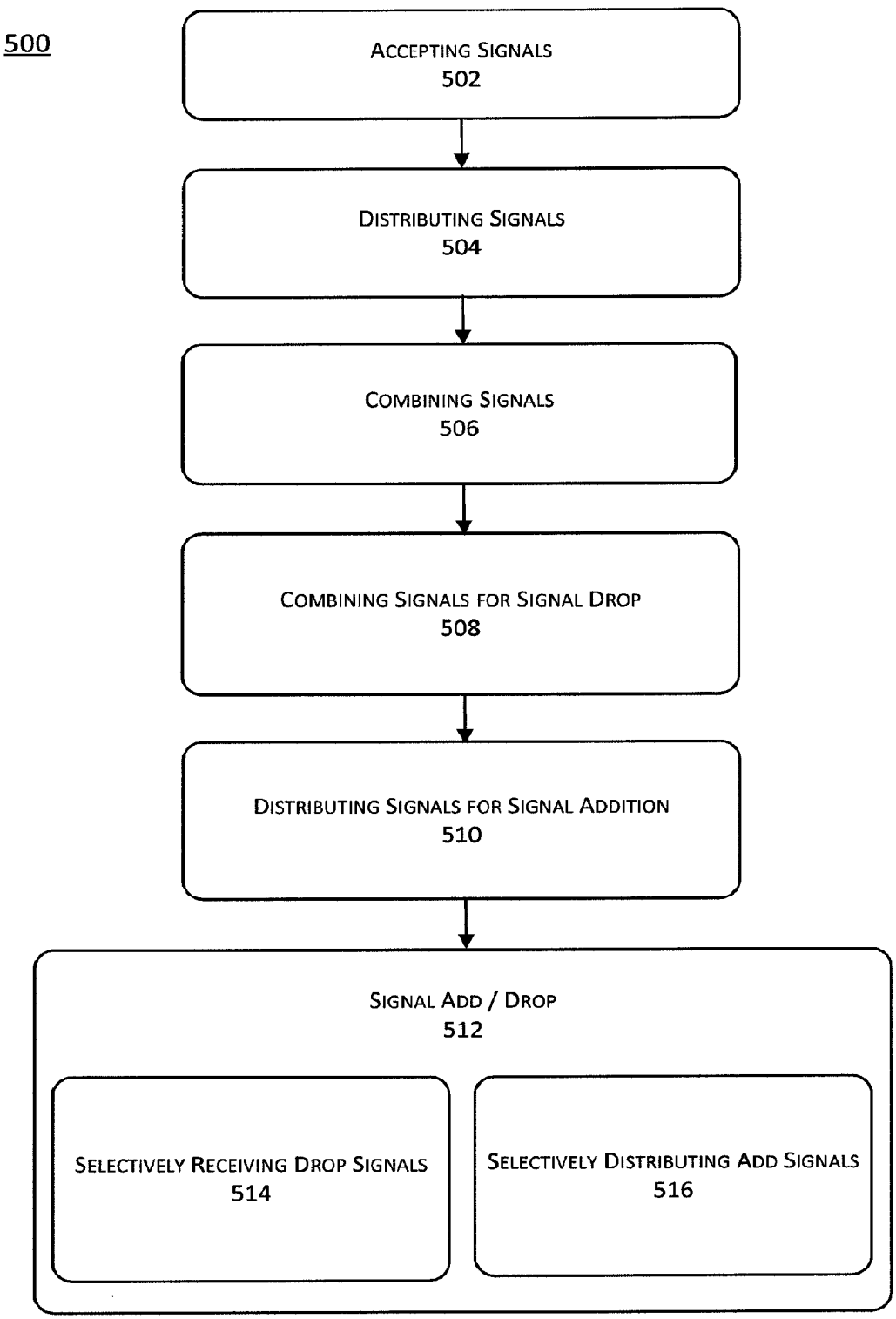
FIG. 5 shows a processing flow for at least an example apparatus in accordance with one or more embodiments of multi-degree reconfigurable optical add-drop multiplexing.

FIG. 5 shows a processing flow 500 for at least an example apparatus in accordance with one or more embodiments of multi-degree reconfigurable optical add-drop multiplexing.

Example processing flow 500 may include one or more operations, actions, or functions as illustrated by one or more of blocks 502, 504, 506, 508, 510, 512, and sub-blocks 514 and 516. Although illustrated as discrete blocks, various blocks may be divided into additional blocks, combined into fewer blocks, or eliminated, depending on the desired implementation. Further, in accordance with a first example embodiment, processing flow 500 is described in the context of apparatus 100, apparatus 200, apparatus 300 and apparatus 400 on which multi-degree reconfigurable optical add-drop multiplexing is achieved. Processing flow 500 may begin at block 502.

Block 502 (Accepting Signals) may include distributing device 110 accepting a plurality of input signals from a plurality of input optical fibers, such as the input optical fiber 102.

Block 504 (Distributing Signals) may include at least one of first coupling elements 112a-k of distributing device 110 distributing the input signals into a plurality of groups of signals. The distributing of the signals may be partially executed by a wavelength selective switch. For example, at least one of the first coupling elements 112a-k may be a wavelength selective switch.

Block 506 (Combining Signals) may include at least one of second coupling elements 122a-l of combining device 120 accepting a plurality of groups of signals from distributing device 110 and signal coupling device 130 and combining at least some of the accepted signals into an output group of signals provided to output optical fiber 106. The combining of signals may be partially executed by a wavelength selective switch. For example, at least one of the second coupling elements 122a-l may be a wavelength selective switch.

Block 508 (Combining Signals for Signal Drop) may include some or all of third coupling elements 132a-m of signal coupling device 130 accepting a plurality of groups of signals from distributing device 110 and combining at least some of the accepted signals into drop signal groups provided to one or more signal removal units 150a-p of reconfiguration device 140. The combining of signals may be partially executed by a wavelength selective switch. For example, at least one of third coupling elements 132a-m may be a wavelength selective switch.

Block 510 (Distributing Signals for Signal Addition) may include some or all of fourth coupling elements 134a-n of signal coupling device 130 accepting add signal groups from one or more signal addition units 160a-q of reconfiguration device 140, and distributing accepted signals into groups of signals provided to the combining device 120. The distributing of the signals may be partially executed by a wavelength selective switch. For example, at least one of fourth coupling elements 134a-n may be a wavelength selective switch.

Block 512 (Signal Add/Drop) may include reconfiguration device 140 receiving one or more dropped signals or transmitting one or more added signals. Block 512 may include sub-blocks 514 and 516.

Sub-block 514 (Selectively Receiving Drop Signals) may include one of the one or more signal removal units 150a-p of reconfiguration device 140 accepting one or more drop groups of signals from two or more of third coupling elements 132a-m of signal coupling device 130, and selectively receiving at least one of the accepted signals.

Sub-block 516 (Selectively Distributing Add Signals) may include one of the one or more signal addition units 160a-q of reconfiguration device 140 transmitting at least one signal and selectively distributing the at least one signal into one or more add groups of signals provided to two or more of fourth coupling elements 134a-n of signal coupling device 130. Note that a group of signals may include zero signal, one signal, or more than one signal.

Exemplary Computing Device

Figure 6:
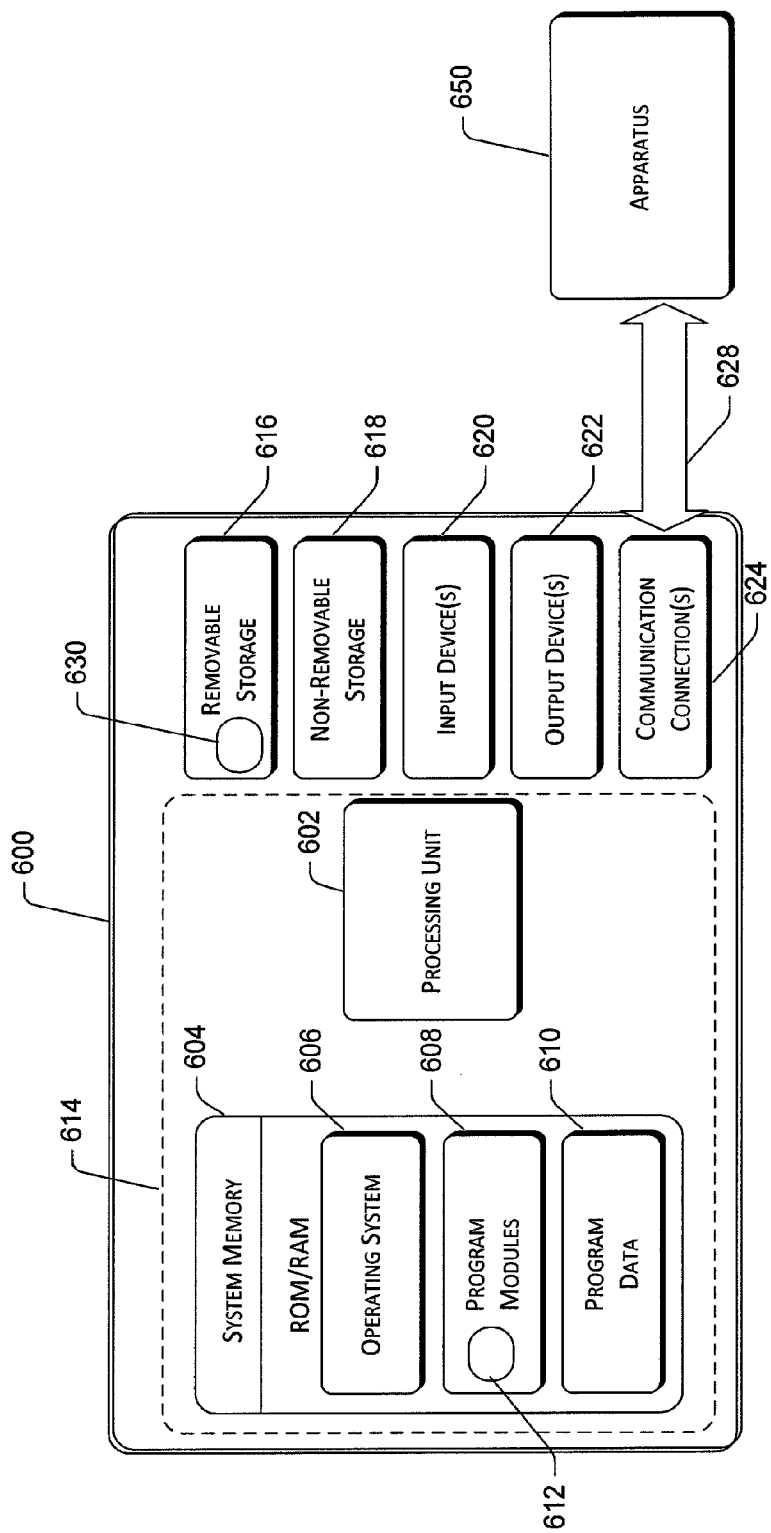
FIG. 6 shows an example computing device that is configured to implement operations of one or more embodiments of multi-degree reconfigurable optical add-drop multiplexing.

FIG. 6 shows an example computing device 600 that is configured to implement operations of one or more embodiments of multi-degree reconfigurable optical add-drop multiplexing.

It will be readily appreciated that the techniques disclosed herein may be implemented in other computing devices, systems, and environments. The computing device 600 shown in FIG. 6 is one example of a computing device and is not intended to suggest any limitation as to the scope of use or functionality of the computer and network architectures.

In at least one implementation, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608, and may include program data 610. A basic implementation of the computing device 600 is demarcated by a dashed line 614. In at least one embodiment, computing device 600 may be a part of apparatus 100, apparatus 200, apparatus 300, or apparatus 400. In at least another embodiment, computing device 600 may be a computing device that is communicatively coupled to apparatus 100, apparatus 200, apparatus 300, or apparatus 400.

The program module 608 may include a module 612 configured to implement multi-degree reconfigurable optical add-drop multiplexing as described above. For example, the module 612 include a set of instructions that, when executed by the processing unit 602, may cause the processing unit 602 to carry out processing flow 500, and variations thereof, e.g., the computing device 600 acting as described above with respect to apparatus 100, apparatus 200, apparatus 300, or apparatus 400.

Computing device 600 may have additional features or functionality. For example, computing device 600 may also include additional data storage devices such as removable storage 616 and non-removable storage 618. In certain implementations, the removable storage 616 and non-removable storage 618 are an example of computer accessible media for storing instructions that are executable by the processing unit 602 to perform the various functions described above. Generally, any of the functions described with reference to the figures can be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 600. Any of such computer accessible media may be part of the computing device 600.

In one implementation, the removable storage 616, which is a computer accessible medium, has a set of instructions 630 stored thereon. When executed by the processing unit 602, the set of instructions 630 cause the processing unit 602 to execute operations, tasks, functions and/or methods as described above, including processing flow 500 and any variations thereof.

Computing device 600 may also include one or more input devices 620 such as keyboard, mouse, pen, voice input device, touch input device, etc. Computing device 600 may additionally include one or more output devices 622 such as a display, speakers, printer, etc.

Computing device 600 may also include one or more communication connections 624 that allow the computing device 600 to communicate with apparatus 650 over network connection 628. Apparatus 650 may be a ROADM. For example, apparatus 650 may be any one of apparatus 100, apparatus 200, apparatus 300, and apparatus 400. In such case, computing device 600 may be a computing device used by an operator to remotely reconfigure apparatus 650, thus eliminating the need for the operator to be on site to physically reconfigure apparatus 650.

Upon executing the set of instructions, whether stored in module 612 of program module 608 or in removable storage 616, processing unit 602 may direct computing device 600 or apparatus 650 to carry out a number of operations to implement multi-degree reconfigurable optical add-drop multiplexing as described above. For example, processing unit 602 may direct a distributing device, e.g., distributing device 110, which accepts a plurality of input signals from an input optical fiber to distribute the input signals into groups of signals. Processing unit 602 may direct a combining device, e.g., combining device 120, which accepts a plurality of groups of signals to combine at least some of the accepted signals into an output signal group provided to an output optical fiber. Processing unit 602 may direct a plurality of third coupling elements, e.g., third coupling elements 132*a-m*, which accept a plurality of signal groups, to combine at least some of the accepted signals into drop signal groups provided to one or more signal removal units. Processing unit 602 may direct a plurality of fourth coupling elements, e.g., fourth coupling elements 134*a-n*, which accept a plurality of add signal groups, to distribute the accepted signals into a plurality of signal groups provided to a combining device. Processing unit 602 may further direct the dropping of one or more signals or direct the adding of one or more signals. With respect to dropping signals, processing unit 602 may direct one of the one or more signal removal units, which accepts a plurality of drop signal groups, to selectively receive at least one of the accepted signals. With respect to adding signals, processing unit 602 may direct one of the one or more signal addition units to transmit a signal and selectively distribute that signal into a plurality of add signal groups provided to two or more of the fourth coupling elements.

It is appreciated that the illustrated computing device 600 is one example of a suitable device and is not intended to suggest any limitation as to the scope of use or functionality of the various embodiments described.

Additional and Alternative Implementation Notes

The architectures described herein are modular in nature as they allow expansion of add/drop groups and addition of add/drop groups as needed without advance planning, thus enabling cost-effective and flexible reconfiguration and growth of a ROADM node in response to changing network traffic patterns which are difficult to predict. The "optional split/demultiplex" and "optional combine/multiplex" elements are expandable in a modular way to accommodate the addition or deletion of channels within a given add or drop group, respectively. For example, each add group may accommodate an expandable bank of transmitters, and each drop group may accommodate an expandable bank of receivers. In practice add and drop channels are often implemented in tandem, and in such a case a combined add-drop group may support an expandable bank of transponders each including at least one transmitter and at least one receiver.

Reduced-contention ROADM architectures described herein allow the degree of contention reduction to be managed in a flexible and modular way. The degree of the node and the amount of add/drop at the ROADM node is also flexible and modular. The use of the described architectures will allow carriers to optimize the tradeoff between the operational benefits of contention reduction and additional ROADM cost, and to manage that optimization effectively as the configuration of the ROADM node changes and as the size of the ROADM changes over time.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

I claim:

1. An apparatus, comprising:
a distributing device configured to accept a first plurality of signals and distribute at least some of the accepted first plurality of signals into a first plurality of groups of signals, each group of the first plurality of groups of signals including zero, one or more than one signal, the distributing device including at least one first coupling element, each of the at least one first coupling element including:
multiple input ports to accept at least some of the first plurality of signals, and
a plurality of output ports to provide at least some of the signals accepted at the input port as one or more groups of signals;
a combining device configured to accept a second plurality of groups of signals and combine at least some of the accepted second plurality of groups of signals into one or more output groups of signals, each group of the second plurality of groups of signals including zero, one or more than one signal, the combining device including at least one second coupling element, each of the at least one second coupling element including:
a plurality of input ports to accept at least some of the second plurality of groups of signals with one or more of the input ports coupled to output ports of one or more of the at least one first coupling element, and
multiple output ports to provide a respective output group of signals,
wherein all the first coupling elements and all the second coupling elements are switchable;
a signal coupling device coupled to the distributing device and to the combining device, the signal coupling device including:
a plurality of third coupling elements, each third coupling element configured to accept a respective third plurality of groups of signals of the first plurality of groups of signals from one or more of the least one first coupling element, combine signals of the accepted respective third plurality of groups of signals into a multiplexed drop group of one or more signals, and output the drop group of one or more signals, and
a plurality of fourth coupling elements, each fourth coupling element configured to accept at least one add group of one or more signals, distribute signals of the accepted at least one add group of one or more signals into a respective fourth plurality of groups of signals, and provide the respective fourth plurality of groups of signals to one or more of the at least one second coupling element; and
a reconfiguration device coupled to the signal coupling device, the reconfiguration device including:
one or more signal removal units, each signal removal unit configured to accept drop groups of one or more signals from two or more of the third coupling elements and to selectively receive one or more signals from the accepted drop groups of one or more signals, at least one of the signal removal unit configured to receive multiple signals assigned to occupy a same portion of wavelength spectrum, at least one of the one or more signal removal units comprising:
- a plurality of splitters or demultiplexers, each of the plurality of splitters or demultiplexers coupled to accept a drop group of one or more signals from a respective one of the third coupling elements through the input port of the respective splitter or demultiplexer and provide a respective plurality of drop groups of one or more signals,
- a switch coupled to two or more of the plurality of splitters or demultiplexers, and
- a receiver coupled to the switch, the receiver configured to accept a plurality of drop groups of one or more signals from two or more of the splitters or demultiplexers through the switch and the respective two or more splitters or demultiplexers.

2. The apparatus of claim 1, wherein the at least one first coupling element is configured to selectively distribute signals on a single wavelength channel or multiple wavelength channels, and wherein the plurality of third coupling elements are configured to selectively combine signals on a single wavelength channel or multiple wavelength channels.

3. The apparatus of claim 1, wherein the at least one first coupling element is configured to selectively distribute signals on a single wavelength channel or multiple wavelength channels, and wherein the plurality of fourth coupling elements are configured to selectively distribute signals on a single wavelength channel or multiple wavelength channels.

4. The apparatus of claim 1, wherein the at least one second coupling element is configured to selectively combine signals on a single wavelength channel or multiple wavelength channels, and wherein the plurality of fourth coupling elements are configured to selectively distribute signals on a single wavelength channel or multiple wavelength channels.

5. The apparatus of claim 1, wherein the at least one second coupling element is configured to selectively combine signals on a single wavelength channel or multiple wavelength channels, and wherein the plurality of third coupling elements are configured to selectively combine signals on a single wavelength channel or multiple wavelength channels.

6. The apparatus of claim 1, wherein one or more of the at least one first coupling element is added or removed in service without disrupting existing signal traffic.

7. The apparatus of claim 1, wherein one or more of the third coupling elements is added or removed in service without disrupting existing signal traffic.

8. The apparatus of claim 1, wherein one or more of the at least one second coupling element is added or removed in service without disrupting existing signal traffic.

9. The apparatus of claim 1, wherein one or more of the fourth coupling elements is added or removed in service without disrupting existing signal traffic.

10. The apparatus of claim 1, wherein at least one of the one or more signal removal units is added or removed in service without disrupting existing signal traffic.

11. The apparatus of claim 1, wherein a number of connections between at least one of the one or more signal removal units and the third coupling elements are increased or decreased in service without disrupting existing signal traffic.

12. The apparatus of claim 1, wherein at least one of the signal removal units is configured to receive multiple signals assigned to occupy different portions of wavelength spectrum.

13. The apparatus of claim 1, further comprising:
one or more signal addition units, each signal addition unit configured to selectively distribute one or more signals into one or more add groups of one or more signals and transmit the one or more add groups of one or more signals to two or more of the fourth coupling elements, at least one of the signal addition unit configured to transmit multiple signals assigned to occupy a same portion of wavelength spectrum.

14. An apparatus, comprising:
a distributing device configured to accept a first plurality of signals and distribute at least some of the accepted first plurality of signals into a first plurality of groups of signals, each group of the first plurality of groups of signals including zero, one or more than one signal, the distributing device including at least one first coupling element, each of the at least one first coupling element including:
- multiple input ports to accept at least some of the first plurality of signals, and
- a plurality of output ports to provide at least some of the signals accepted at the input port as one or more groups of signals;

a combining device configured to accept a second plurality of groups of signals and combine at least some of the accepted second plurality of groups of signals into one or more output groups of signals, each group of the second plurality of groups of signals including zero, one or more than one signal, the combining device including at least one second coupling element, each of the at least one second coupling element including:
- a plurality of input ports to accept at least some of the second plurality of groups of signals with one or more of the input ports coupled to output ports of one or more of the at least one first coupling element, and
- multiple output ports to provide a respective output group of signals,
wherein all the first coupling elements and all the second coupling elements are switchable;

a signal coupling device coupled to the distributing device and to the combining device, the signal coupling device including:
- a plurality of third coupling elements, each third coupling element configured to accept a respective third plurality of groups of signals of the first plurality of groups of signals from one or more of the least one first coupling element, combine signals of the accepted respective third plurality of groups of signals into a multiplexed drop group of one or more signals, and output the drop group of one or more signals, and
- a plurality of fourth coupling elements, each fourth coupling element configured to accept at least one add group of one or more signals, distribute signals of the accepted at least one add group of one or more signals into a respective fourth plurality of groups of signals, and provide the respective fourth plurality of groups of signals to one or more of the at least one second coupling element; and a reconfiguration device coupled to the signal coupling device, the reconfiguration device including:
one or more signal addition units, each signal addition unit configured to selectively distribute one or more signals into one or more add groups of one or more signals and transmit the one or more add groups of one or more signals to two or more of the fourth coupling elements, at least one of the signal addition unit configured to transmit multiple signals assigned to occupy a same portion of wavelength spectrum, at least one of the one or more signal addition units comprising:

a plurality of combiners or multiplexers, each of the plurality of combiners or multiplexers coupled to accept an add group of one or more signals and provide the add group of one or more signals to at least one of the fourth coupling elements, a switch coupled to two or more of the combiners or multiplexers, and a transmitter coupled to the switch, the transmitter configured to distribute one or more signals into the add group of one or more signals and transmit the add group of one or more signals to two or more of the fourth coupling elements through the switch and the respective two or more combiners or multiplexers.

15. The apparatus of claim 14, wherein the at least one first coupling element is configured to selectively distribute signals on a single wavelength channel or multiple wavelength channels, and wherein the plurality of third coupling elements are configured to selectively combine signals on a single wavelength channel or multiple wavelength channels.

16. The apparatus of claim 14, wherein the at least one first coupling element is configured to selectively distribute signals on a single wavelength channel or multiple wavelength channels, and wherein the plurality of fourth coupling elements are configured to selectively distribute signals on a single wavelength channel or multiple wavelength channels.

17. The apparatus of claim 14, wherein the at least one second coupling element is configured to selectively combine signals on a single wavelength channel or multiple wavelength channels, and wherein the plurality of fourth coupling elements are configured to selectively distribute signals on a single wavelength channel or multiple wavelength channels.

18. The apparatus of claim 14, wherein the at least one second coupling element is configured to selectively combine signals on a single wavelength channel or multiple wavelength channels, and wherein the plurality of third coupling elements are configured to selectively combine signals on a single wavelength channel or multiple wavelength channels.

19. The apparatus of claim 14, wherein one or more of the at least one first coupling element is added or removed in service without disrupting existing signal traffic.

20. The apparatus of claim 14, wherein one or more of the third coupling elements is added or removed in service without disrupting existing signal traffic.

21. The apparatus of claim 14, wherein one or more of the at least one second coupling element is added or removed in service without disrupting existing signal traffic.

22. The apparatus of claim 14, wherein one or more of the fourth coupling elements is added or removed in service without disrupting existing signal traffic.

23. The apparatus of claim 14, wherein at least one of the one or more signal addition units is added or removed in service without disrupting existing signal traffic.

24. The apparatus of claim 14, wherein a number of connections between at least one of the one or more signal addition units and the fourth coupling elements are increased or decreased in service without disrupting existing signal traffic.

25. The apparatus of claim 14, wherein at least one of the signal addition units is configured to transmit multiple signals assigned to occupy different portions of wavelength spectrum.

* * * * *